US012800421B2

(12) United States Patent
Thyssen et al.

(10) Patent No.: US 12,800,421 B2
(45) Date of Patent: *Nov. 17, 2026

(54) LEAK DETECTOR WITH CLAMP FOR ENCLOSING A SECTION OF PIPE

(71) Applicant: Agramkow Fluid Systems A/S, Sønderborg (DK)

(72) Inventors: Leif Thyssen, Sydals (DK); Morten Klietsch, Sønderborg (DK); Lasse Parnell Hansen, Aabenraa (DK)

(73) Assignee: Agramkow Fluid Systems A/S, Sønderborg (DK)

(*) Notice: Subject to any disclaimer, the term of this patent is extended or adjusted under 35 U.S.C. 154(b) by 238 days.

This patent is subject to a terminal disclaimer.

(21) Appl. No.: 18/933,786

(22) Filed: Oct. 31, 2024

(65) Prior Publication Data

US 2025/0130131 A1 Apr. 24, 2025

Related U.S. Application Data

(63) Continuation of application No. 17/447,854, filed on Sep. 16, 2021, now abandoned, which is a (Continued)

(30) Foreign Application Priority Data

Dec. 20, 2019 (DK) ............................ PA201970813

(51) Int. Cl.
*G01M 3/04* (2006.01)
*G08C 23/06* (2006.01)
(Continued)

(52) U.S. Cl.
CPC ............... *G01M 3/04* (2013.01); *G08C 23/06* (2013.01); *G01M 3/18* (2013.01); *G01M 3/22* (2013.01)

(58) Field of Classification Search
CPC ........... G01M 3/04; G01M 3/16; G01M 3/18; G01M 3/181; G01M 3/182; G01M 3/183; G01M 3/184; G01M 3/185
See application file for complete search history.

(56) References Cited

U.S. PATENT DOCUMENTS 5,293,771 A * 3/1994 Ridenour ................ G01M 3/20 73/40
12,085,479 B2 9/2024 Thyssen et al.
(Continued)

FOREIGN PATENT DOCUMENTS

CN 203479472 U * 3/2014
CN 207717291 U * 8/2018
(Continued)

OTHER PUBLICATIONS

Machine translation of CN 110005898 (Year: 2019).*
(Continued)

*Primary Examiner* — Nathaniel J Kolb
(74) *Attorney, Agent, or Firm* — Knobbe, Martens, Olson & Bear, LLP

(57) ABSTRACT

A leak detector includes a gas sensor and a purge gas supply in fluid communication with a probe head. The fluid communication has a first communication direction for the gas sensor and a second communication direction opposite to the first communication direction for the purge gas supply. The gas sensor and the purge gas supply are configured for communication through a common conduit for the fluid communication with the probe head through one or more probe head ports. Only one of the gas sensor or the purge gas supply can be in fluid communication with the probe head at a time.

12 Claims, 5 Drawing Sheets

Related U.S. Application Data continuation of application No. 17/433,441, filed as application No. PCT/EP2020/084929 on Dec. 7, 2020, now Pat. No. 12,085,479.

(51) Int. Cl.

*G01M 3/18* (2006.01)
*G01M 3/22* (2006.01)

(56) References Cited

U.S. PATENT DOCUMENTS

| | | | | |
|---|---|---|---|---|
| 2011/0283769 | A1 | 11/2011 | Bohn et al. | |
| 2012/0260722 | A1 * | 10/2012 | McGregor | G01M 3/207 73/40.7 |

FOREIGN PATENT DOCUMENTS

| | | | | |
|---|---|---|---|---|
| CN | 109724750 | A | 5/2019 | |
| CN | 110005898 | A * | 7/2019 | F16L 55/035 |
| CN | 110285930 | A * | 9/2019 | G01M 3/18 |
| CN | 110631780 | A * | 12/2019 | G01M 3/2815 |
| DE | 29601629 | U1 | 3/1996 | |
| DE | 102013021313 | A1 * | 6/2015 | G01M 3/205 |
| EP | 2485030 | A1 | 8/2012 | |
| JP | 2003035622 | A * | 2/2003 | |
| WO | WO 99/10721 | A1 | 3/1999 | |
| WO | WO 2012/120179 | A1 | 9/2012 | |
| WO | WO 2012/142402 | A1 | 10/2012 | |

OTHER PUBLICATIONS

Machine translation of CN 110285930 (Year: 2019).*
Machine translation of CN 110631780 (Year: 2019).*
Machine translation of 203479472 (Year: 2014).*
Machine translation of CN 207717291 (Year: 2018).*
Machine translation of DE 102013021313 (Year: 2013).*
Machine translation of JP 2003035622 (Year: 2003).*
International Search Report for International Patent Application No. PCT/EP2020/084929, dated Jun. 21, 2021 in 5 pages.

* cited by examiner

LEAK DETECTOR WITH CLAMP FOR ENCLOSING A SECTION OF PIPE

CROSS-REFERENCE TO RELATED APPLICATIONS

This application is a continuation of U.S. application Ser. No. 17/447,854, filed on Sep. 16, 2021, which is a continuation of U.S. application Ser. No. 17/433,441, filed on Aug. 24, 2021, which is the U.S. National Phase under 35. U.S.C. § 371 of International Application PCT/EP2020/084929, filed Dec. 7, 2020, which claims priority to Danish Patent Application No. PA 2019 70813, filed Dec. 20, 2019. The disclosures of the above described applications are hereby incorporated by reference in their entirety.

FIELD OF DISCLOSURE

The disclosure relates to a leak detector, a probe head for a leak detector, a method of leak detection using the leak detector and use of the leak detector. The probe head comprises a clamp, which forms a chamber in closed position. The probe head comprises activation means for shifting the clamp between an open position and the closed position by interaction with a pipe section. The leak detector comprises a common conduit configured for detector purpose and for purging the sample area.

BACKGROUND

Leak testing is applied in a broad range of industries as part of the quality control process for testing products or systems that seal to hold a fluid in or hold a fluid out.

Leak testing is important in multiple aspects including daily safety, environmental protection, reliability of production processes and products.

Leak testing can be performed as quantitative or qualitative test methods and applied in industries such as the automotive, refrigeration and air conditioning, for testing medical devices, pharmaceutical packaging, consumer electronics amongst other. Leak detection can be useful to incorporate in production lines, for quality control, maintenance and for reworking or repairing products and systems.

Leak testing of can be achieved using various leak detection methods. The choice of the detection method depends on which method is most appropriate for the system at hand this may include the size of the system, the type of material contained in the system, the rigidity of the system, the accessibility and the operating temperature of the system.

Especially pipelines are subject for leak detection and even a minor leak may be of particular importance for pipelines, which requires fluids under pressure or a special composition of fluids to operate in an optimal manner. Another aspect may concern safety of operation for example if a system or product is operated with flammable fluids or toxic fluids.

In pipe systems leak testing of joints are of particular interest, as these typically represent the weak points subject for assembly defects, corrosion or other defects arising due to operating conditions e.g. vibrations, temperature or pressure variations.

Leak detectors for detection of signal gasses leaking from devices are widely known e.g. devices forming a chamber with the surface of the device to be tested are commonly known. Common signal gases includes helium, tracer gas and refrigerants (signal gas).

The challenges with the leak detectors used today concerns the accuracy and repeated continuous use of the leak detector.

WO2012/142402 discloses a leak detection device having a clamp for enclosing a pipe section with a potential leak and forming an inner sample volume. The device uses an external gas flow to exclude surrounding gas from contaminating the sample volume, an internal gas flow to purge the sample volume and remove background contamination of the sample volume and a gas sensor (sniffer) for detecting a signal gas.

US2016202138 discloses a sniffer for leak detection with a self-cleaning particle filter.

WO2012/142402 and US2016202138 addresses some of the problems concerned with leak detection such as eliminating background contamination and how to reduce the contamination of the sniffer such that the downtime of the sniffer between tests is reduced.

OBJECTIVE OF THE DISCLOSURE

It is an objective to overcome one or more of the before mentioned shortcomings of the prior art.

One objective is to achieve a leak detector and a method for leak detection with reduced reset-time for improved repeated continuous use. A further objective is to achieve a probe head suitable for pipe systems system for improved accuracy of the detection. Yet another objective is to achieve an easy-use leak detector.

DESCRIPTION OF THE DISCLOSURE

One objective of the disclosure is a probe head for a leak detector. The probe head may comprise one or more probe head ports and a clamp.

The clamp may be arranged for shifting between an open position for receiving a pipe section and a closed position for enclosing the pipe section. The clamp may furthermore be arrange to form a chamber around the pipe section in the closed position.

At least one of said probe head ports may open into the inside of the chamber.

The probe head comprises activation means for shifting the clamp from the open position to the closed position by interaction with the pipe section.

The probe head is not limited to enclose a specific shape of the pipe section and may include a blunt pipe or a section of a continuous pipe. The leak detection may be directed to specific areas such as mechanical joints, soldiered joints, pipe bends, pipe ends or other sections representing weak points subject for assembly defects, corrosion or other defects arising due to operating conditions e.g. vibrations, temperature or pressure variations.

One effect of the probe head may be that the chamber forms a chamber surrounding the pipe section to be inspected, and thus encloses a sample volume specifically from the volume surrounding the section of the pipe system to be tested. This may be advantageous for testing the entire circumference of the pipe section and for testing only the volume surrounding that pipe section. This may improve the quality of the measurements by eliminate faults such areas of a pipe section not being inspected because of difficult or limited accessibility of a probe. Other faults, which may be eliminated by the presence of a chamber, could include inaccuracy of measurements due to draft around the pipe section and hence rarefaction of the signal gas to be detected.

Another effect of the probe head may be that the clamp comprises an opening and closing function, which is affected by interaction with the tube section, i.e. the clamp closes when it interacts with the pipe section and opens when there is no interaction. One advantage may be that the operation of the probe head may easier to operate in a correct way either manually or automatically. This may have the further advantage of reducing wear and tear of the probe head but also eliminate the impact on the pipe system to be tested. Such impact could include shock, push or shaking of the pipe system caused by the operator of the probe head when positioning, clamping or releasing the probe head.

The clamp may be adapted for pipe systems having an outer pipe diameter in the range 2-12 mm. Pipe systems with these dimensions are common in refrigerators, freezers, AC units, AC in cars.

The activation means comprises one or more activation points. The activation points may be configured for mechanically activation of the clamp by an applied force applied to at least one of the activation points. The clamp may be gradually closed as a function of the magnitude of the applied force.

Alternatively, the activation points may be configured for mechanically activation of the clamp by an applied force applied to multiple activation points.

The gradually closing as a function of the magnitude of the applied force has the meaning, that the size of the opening in the clamp is a function of the applied force. I.e. the clamp has a closing function where the clamp goes from the open position with a full opening of the clamp when there is no applied force, to a closed position with no opening in the clamp when an applied force of a certain magnitude is applied to one or more activation points. The clamp has an opening function vice versa to the closing function. During the shift between the open position and the closed position, the opening in the clamp changes from fully open to fully closed, wherein the gradually size of the opening is a function of the size of the applied force.

The force required for closing the clamp may depend on the actual design of the clamp and the intended application of the probe head.

One effect of the embodiment is that the operation of the clamp may be perform by simply pressing the probe head against one or more areas of the pipe. This may be advantageous in regard to omitting any additional closing or opening means for operating the probe head. An additional advantage is that the probe head do not require any means for mounting or fastening the probe head to the pipe section with the risk of impacting the pipe system with excessive forces during fastening and unfastening.

Another effect of the embodiment is that no additional parts for or knowledge about fastening and unfastening the probe head to the pipe section is/are required.

In one embodiment of the probe head, the clamp may comprise an inner part, an outer part having a lower jaw, an upper jaw and two connection points connecting the upper jaw with the lower jaw.

The clamp may comprise a transversal opening between the connection points. The opening may be arranged to receive the pipe section.

At least one of the connection points may be configured as an activation point, configured to be mechanically activated by an applied force directed towards the inner part to shift the clamp from the open position to the closed position by means of deformation of the clamp.

One effect of this embodiment may be that the part of the pipe section applying the force to the activation point also causes the clamp to deform in and around the activation point. This deformation may extend across the clamp and cause the closing of the clamp. Furthermore, the deformation in and around the activation point may be designed for form a closing of the clamp around the pipe circumference, such that a fully closed chamber is achieved when the clamp is in the closed position, which preferably is substantially sealed off from the environment.

Another effect is that the force to be applied to the one or more activation points may be in the same direction as the entering of the pipe section to the clamp and thus the direction of movement is to be continued for activation the shift from open to close. Likewise for activating the shift from closed to open and subsequent removing the probe head away from the pipe, the direction of movement is the same for both processes. Hence the operation of the probe head is very intuitive and do not require specific knowledge or training.

In one embodiment of the probe head, the clamp may be made of an elastic material.

The effect of using an elastic material may be that the clamp may be made in a single piece, wherein the closing and opening of the clamp is achieved by a reversible deformation of the clamp. This eliminates the risk of any joints in the clamp and hence the chamber, which may be subject for contamination or rarefaction of the sample volume and resulting inaccurate measurements.

Another effect of elastic material may be repeated use of the probe head due to the reversibility of the deformations of the material and hence the clamp. This may be advantageous in regard to a prolonged lifetime while maintaining the original shape and dimensions. Furthermore, the clamp may be produced with low cost due to the material itself and production methods e.g. injection moulding. Furthermore, using an elastic material may have the effect that the clamp may be mounted onto the probe head by no additional means and adhering thereto due to the elastic properties. The clamp may furthermore be a replaceable part of the probe head extending the lifetime of the probe head.

In a further embodiment of the probe head, the elastic material may be transparent or partly transparent, such that a certain degree of transparency of the clamp is achieved. This may be advantageous if the probe head comprises optical transducers, which preferable should be visible for an operator. It may provide other advantages such as visibility for the operator of the enclosed parts by the clamp e.g. that a joint to be tested is fully enclosed in the chamber.

The elastic material may include silicone rubber

The effects of the clamp made in silicone rubber is directly related to the properties of silicone rubber including retaining its initial shape and mechanical strength when subjected to thermal and mechanical stress. Silicone rubber is highly inert and does not react with most chemicals including withstanding aging factors such as ozone, UV and heat.

Hence the effect of the clamp being made of silicone rubber is that the clamp may not be contaminated by the potential gasses it is exposed to during the leak tests and do not contaminate the leak test by releasing or forming agents.

Furthermore, silicone rubber may be manufactured into any desired shape by a form-and-cure process or alternatively by injection moulding, with the effects and benefits hereof as previously described.

Alternatively, the clamp may be made of any kind of elastic elastomer (Pure rubber) having similar elastic properties as silicone rubber.

Another objective of the disclosure is a leak detector. The leak detector may comprise a gas sensor and a purge gas supply in fluid communication with a probe head. The leak detector may have a first communication direction for the gas sensor and a second communication direction for the purge gas supply. The communication directions may be opposite to each other.

The gas sensor and the purge gas supply may be configured for communication through a common conduit for the fluid communication with the probe head through one or more probe head ports. Only one of the gas sensor or the purge gas supply may be in fluid communication with the probe head at a time.

The gas sensor may be any gas sensor suitable for detecting a given signal gas. The gas sensor could comprise a mass-spectroscopy detector or turbo molycular helium or hydrogen detector. This should merely be considered examples and hence, other comparable detectors suitable for gas detection.

The gas sensor with an applied suction resulting in a fluid communication and a communication direction towards the gas sensor may be known as a sniffer.

Using the same probe head port and conduit in the leak detector for purging and for detection may have the effect that the purging also flushes the conduit connecting the gas sensor to the probe head. This may reduce the risk of contamination a later sample and/or overexposing the gas sensor with the remains of the previous sample or gases from the surroundings entering the conduit to the gas sensor.

Generally, leak detectors uses a sniffer with a separate conduit with no purging applied to that conduit. This means that the existing content of the conduit has to be removed by suction of ambient air through the conduit and passing the gas sensor. Depending on the sniffer and type of gas sensor, it may take up to 30 minutes to clean a conventional sniffer after e.g. a massive leak of Helium. I.e. a reset time of the sniffer and hence the leak detector of 30 minutes.

Another effect of the embodiment having a common conduit for the gas sensor and the purge gas supply may be a shorter reset time and hence a leak detector, which may be used for continuous measurements. Tests have shown that a reset time of as short as 30 seconds may be achieved after the gas sensor has been subjected to liquid Helium.

In one embodiment, the leak detector may further comprise, in communication with the gas sensor, a valve for changing the communication direction.

The gas sensor may be set with a threshold value of content of signal gas in a sample volume. The gas sensor may furthermore be configured to communicate a change signal to the valve. The valve may be configured to change the communication direction upon receipt of the change signal.

A certain threshold value of content of signal gas in a sample volume may indicate a positive result of leak detection.

One effect of this embodiment may be to change the communication direction as soon as the threshold value and thus a positive leak measurement is reached. By reverting the communication direction, purging of the common conduit may be started, thereby avoiding excessive exposure of the gas sensor in combination with a rapid initiation of rinsing the common conduit.

In a further embodiment, the leak detector may further comprise a timer in communication with the valve. The timer may be set with a time interval. The timer may be configured to start upon receipt of a start signal where the valve changes the communication direction towards the gas sensor and further configured to send a change signal to the valve.

One effect of this embodiment may be to change the communication direction if the threshold value is not reached within the set time interval and hence when a there is no positive leak measurement. By reverting the communication direction, purging of the common conduit may be started, thereby avoiding unnecessary prolonged exposure of the gas sensor.

In one embodiment, the leak detector may comprise the probe head according to any of the previously described embodiments.

The effects and advantages of this embodiment includes those already described either individually or in combination.

In a further embodiment, the leak detector comprising the probe head may further comprise an outer purging conduit in fluid communication with a purging gas supply and the probe head. One or more of the probe head ports may open to the exterior of the clamp for providing an outer purging of the clamp.

One effect of performing an outer purging may be to purge the volume around the pipe section to be inspected prior to closing the clamp, such that the sample volume is not pre-contaminated, thereby achieving optimized conditions for taking valid samples.

Furthermore, the purging may be continues during the measuring process, where the fluid communication direction is from the chamber towards the gas sensor. During this process, a slight negative pressure may arise in the chamber and hence, if the chamber does not seal sufficiently, ambient gasses to the clamp may enter the chamber and the sample volume. If an outer purging gas is applied, a slight rarefaction may occur but without contaminating the sample volume with possible residues of a leak in the pipe section or other leaks in the pipe system.

In a further embodiment, the leak detector comprising the probe head may further comprise a position sensor for detecting the position of the pipe section relative to the clamp. The leak detector may furthermore comprise one or more transduces in communication with the position sensor. The position sensor may be configured to communicate a stop signal. The one or more transduces may be configured to output an optical and/or acoustic signal upon receipt of the stop signal.

One effect of this embodiment may be to guide an operator of the leak detector to position the leak detector correct by giving a signal, when the leak detector is in the right position and the measurements can be commenced.

The transponders could for example include optical transducers such as red and green lamps arrange internal or external to the clamp.

The transducers may be used for multiple purposes e.g. for indicating that the measurement has be correctly performed either due to expiry of the time interval for detection or that a positive result has been reached; for indicating the result of the leak test as passed or failed or for other relevant indications.

In a further embodiment, the leak detector comprising the probe head may further comprise a dampening unit. The dampening unit may be adapted to be set with a threshold force magnitude, and configured to regulate the position of the probe head relative to the pipe section as a function of the applied force to the one or more activation points.

In one aspect, the dampening unit may comprise a pneumatic damper.

One effect of the embodiment may be that the physical interaction of the leak detector with the pipe section may be dampened, when the probe head presses against one or more areas of the pipe. This may be advantageous when the leak detector is used whit flexible or delicate pipes for reduced risk of bending or in other ways mechanically influencing the pipe section or pipe system.

The embodiment may be beneficial for both manually operation and automated operation of the leak detection. In the following operator may have the meaning of a person, a semi- or full-automated system e.g. including a feed-back system.

In operation, the damping unit may provide feedback to the operator, indicating that the probe head interacts correctly with the pipe joint to be tested. The feedback signal may for example be used for setting a timer of a correct processing time of the leak detection at a correct position. The operation position and the processing time may be specified in a test protocol.

For operation of the leak detector, the damping unit may be pre-adjusted with various pressure settings prior to operation. This may be beneficial in regard to adjusting the leak detector to the pipe-system to be tested. Depending on the diameter, the material, the wall thickness of the pipe and the mounting hereof, the flexibility of the pipe system and/or the single pipe section may vary. The leak detector may thus be used be pre-set with or alternatively, self-adjusting to a desired applied force suitable for the specific pipe section.

Another objective of the disclosure is a method of leak testing a pipe joint using a leak detector according to any of the previously described embodiments.

The method may comprise acts of arranging the probe head at a distance of a pipe joint to be leak tested and supplying a purge gas from the purge gas supply via the common conduit to purge an area surrounding or partly surrounding the pipe joint.

The method may furthermore comprise acts of reverting the communication direction in the common conduit to perform suction of one or more sample volumes from the area surrounding or partly surrounding the pipe joint, performing continuously measurements of content of a signal gas in the one or more sample volume, and reverting the communication direction in the common conduit to supply purge gas, when a threshold value of content of signal gas in a sample volume or a set time-interval is reached.

The effects and advantages of this method includes those already described in connection with using a common conduit to supply purge gas to the probe head and for collecting one or more sample volumes to the gas sensor.

The effects includes that the purging flushes the conduit connecting the gas sensor to the probe head for:

- reduced risk of contamination of a later sample and/or overexposing the gas sensor with the remains of the previous sample or gases from the surroundings entering the conduit to the gas sensor, and
- Reduced reset time and hence a leak detector which may be used for continuous measurements.

In a further embodiment of the method of testing a pipe joint, the leak detector furthermore comprises a probe head with a clamp for enclosing the pipe joint and forming a chamber, and an outer purging conduit in fluid communication with a purge gas supply and the probe head for providing an outer purging external to the clamp. The method comprises a further act of applying an outer purging external to the clamp at least during the act of performing continuously measurements of content of a signal gas in the sample volume.

The effects and advantages of this method includes those already described in connection with the leak detector having an outer purging conduit for providing an outer purging of the clamp:

- The outer purging may purge the volume around the pipe section to be inspected prior to closing the clamp, such that the sample volume is not pre-contaminated, thereby achieving optimized conditions for taking valid samples.
- The purging may be continued during the measuring process, where the fluid communication direction is from the chamber towards the gas sensor. During this process, a slight negative pressure may arise in the chamber and hence, if the chamber does not seal sufficiently, ambient gasses to the clamp may enter the chamber and the sample volume. If an outer purging gas is applied, a slight rarefaction may occur but without contaminating the sample volume with possible residues of a leak in the pipe section or other leaks in the pipe system.

Another objective of the disclosure is use of the leak detector for detecting leaks in pipe joints during leak testing of pipe systems in refrigerators, freezers, AC units, AC in cars. The use may be for detecting the signal gas or the refrigerant applied to the pipe system during the leak test.

The leak detector may be used for pipe systems having an outer pipe diameter in the range 2-12 mm. Pipe systems with theses dimensions are common within consumer goods with cooling applications.

The signal gas may include helium, forming gas comprising a mixture of nitrogen and 5-7% hydrogen.

The use may be for intermediate detection prior to refilling of refrigerant or after refilling of cooling gas, especially in the process of closing the pipe system.

BRIEF DESCRIPTION OF THE DRAWINGS

Various embodiments of the disclosure or examples hereof are described hereinafter with reference to the figures. Reference numbers refer to like elements throughout. Like elements will, thus, not be described in detail with respect to the description of each figure.

It should also be noted that the figures are only intended to facilitate the description of the embodiments or examples hereof. They are not intended as an exhaustive description of the claimed invention or as a limitation on the scope of the claimed invention.

In addition, an illustrated example needs not have all the aspects or advantages shown. An aspect or an advantage described in conjunction with a particular example is not necessarily limited to that example and can be practiced in any other examples even if not so illustrated, or if not so explicitly described.

Figure 1:
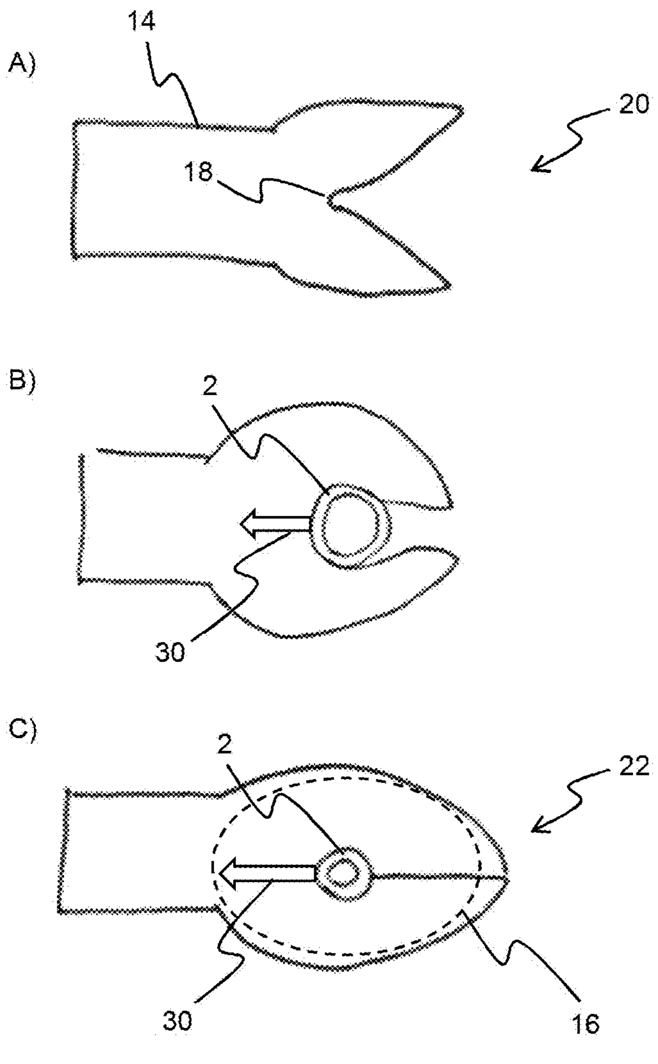

FIG. 1 illustrates one embodiment of the clamp.

Figure 2:
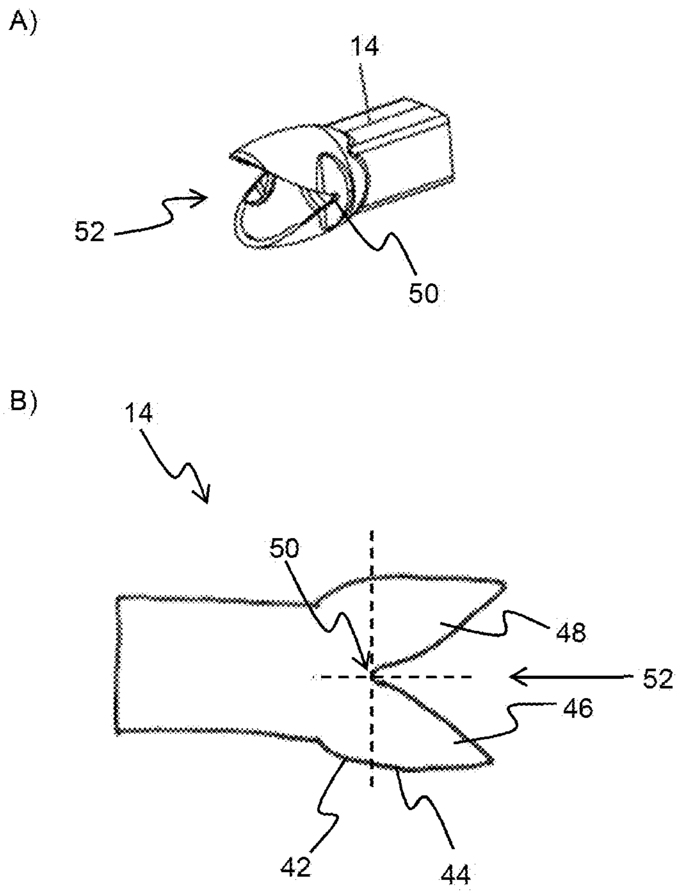

FIG. 2 illustrates an embodiment of the clamp.

Figure 3:
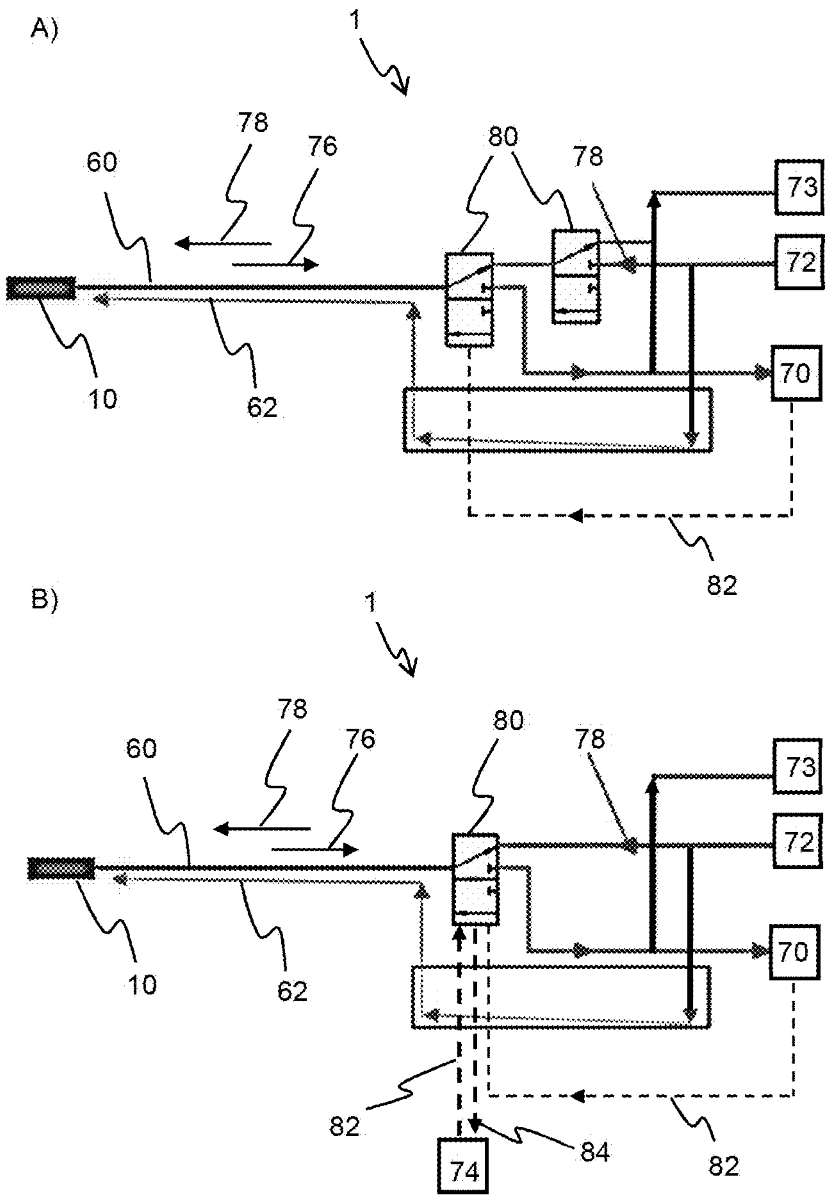

FIG. 3 illustrates two embodiments of the leak detector.

Figure 4:
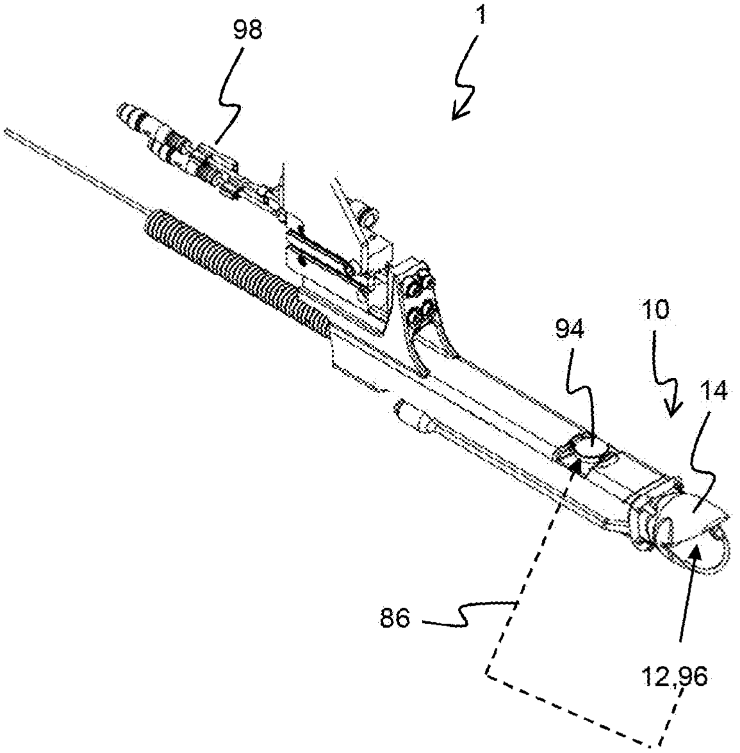

FIG. 4 illustrates one embodiment of the leak detector.

Figure 5:
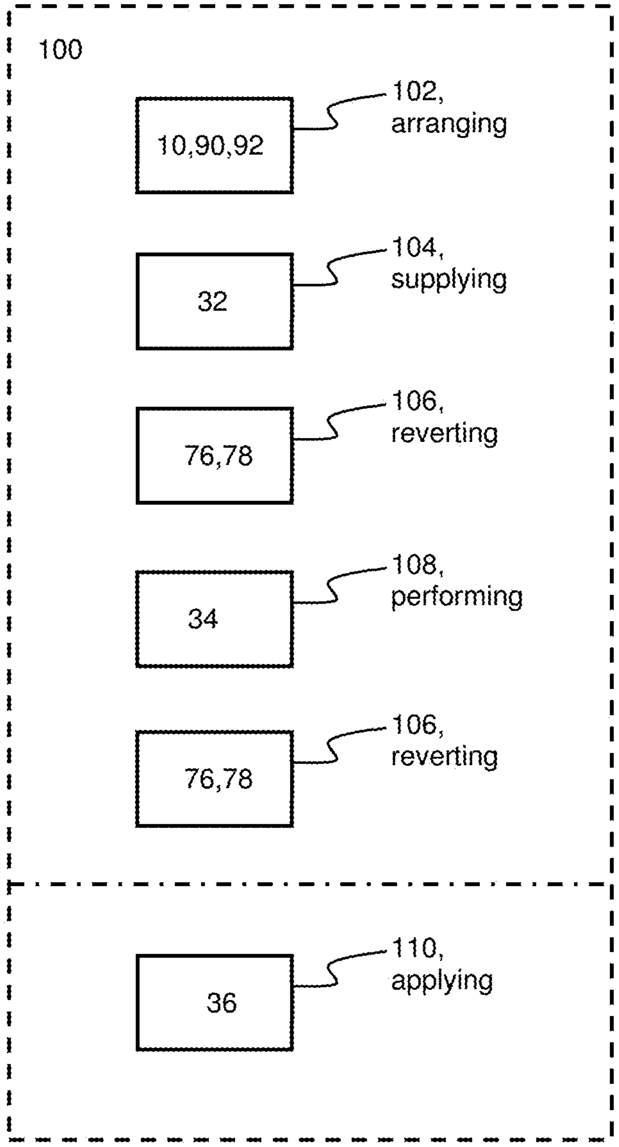

FIG. 5 illustrates two embodiments of the method of leak detection.

DETAILED DESCRIPTION OF THE DISCLOSURE

No Item
1 leak detector
2 pipe section
10 probe head 12 probe head ports
14 clamp
16 chamber
18 activation point
20 open position
22 closed position
30 applied force
32 purge gas
34 signal gas
36 outer purging
42 inner part
44 outer part
46 lower jaw
48 upper jaw
50 connection points
52 transversal opening
60 common conduit
62 outer purging conduit
70 gas sensor
72 purge gas supply
73 vacuum pump
74 timer
76 first communication direction
78 second communication direction
80 valve
82 change signal
84 start signal
86 stop signal
92 pipe joint
94 transduces
96 position sensor
98 dampening unit
100 method
102 arranging
104 supplying
106 reverting
108 performing
110 applying Exemplary examples will now be described more fully hereinafter with reference to the accompanying drawings. In this regard, the present examples may have different forms and should not be construed as being limited to the descriptions set forth herein. Accordingly, the examples are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list.

The spatially relative terms "lower", "upper", "inner" and "outer" and the like, may be used herein for ease of description to describe the relationship between one element or component and another element or component as illustrated in the drawings. It will be understood that the spatially relative terms are intended to encompass different orientations of the device in use or operation, in addition to the orientation depicted in the drawings.

Throughout the specification, when an element is referred to as being "connected" to another element, the element is "directly connected" to the other element, or "electrically connected" to the other element with one or more intervening elements interposed there between.

The terminology used herein is for the purpose of describing particular examples only and is not intended to be limiting. As used herein, the singular forms "a," "an," and "the" are intended to include the plural forms, including "at least one," unless the content clearly indicates otherwise. "At least one" is not to be construed as limiting "a" or "an." It will be further understood that the terms "comprises", "comprising," "includes" and/or "including," when used in this specification, specify the presence of stated features, integers, steps, operations, elements, and/or components, but do not preclude the presence or addition of one or more other features, integers, steps, operations, elements, components, and/or groups thereof.

FIG. 1 illustrates one embodiment of the clamp 14 in interaction with a pipe section 2. FIG. 1A illustrates the clamp 14 in the open position 20 adapted for receiving the pipe section. The opening of the clamp 14 comprises the activation means 18.

In FIG. 1B the clamp is illustrated in transition between the open and the closed position. The pipe section 2 interacts with the clamp in at least one activation point with an applied force 30.

FIG. 1 C illustrates the clamp in the closed position 22. The closed position is obtained by applying a larger force 30 to the activation point(s) 18. In the closed position 22, the clamp forms a chamber 16 and encloses the pipe section 2 herein. The clamp 14 closes around the circumference of the pipe in contact with the activation point.

FIG. 2 also illustrates an embodiment of the clamp 14. FIG. 2A illustrates the clamp in perspective view and FIG. 2B illustrates the clamp in a side view. The clamp 14 comprises an inner part 42, an outer part 44 having a lower jaw 46, an upper jaw 48 and two connection points 50 connecting the upper jaw 48 with the lower jaw 46. Between the connection points 50, the clamp comprises a transversal opening 52 arranged to receive the pipe section 2. One or both of the connection points 50 may configured as activation points 18 configured to be mechanically activated by an applied force 30 directed towards the inner part 42. The mechanically activation of the activation points may cause the clamp to shift from the open position to the closed position and thus to be operated as illustrated in FIG. 1. The shift of the clamp between the open and closed position may be achieved by means of deformation of the clamp 14. The deformation may in particular occur in the area around the connection point 50 being used as activation point for the specific operation. This deformation may further cause the clamp to close tightly around the circumference of the pipe interacting with the activation point and thus achieve that the clamp may be fully closed in the closed position.

FIG. 3 illustrates two embodiments of the leak detector 1 in FIG. 3A and FIG. 3B, respectively. In both embodiments, the leak detector 1 comprises a gas sensor 70, a vacuum pump 73 and a purge gas supply 72 in fluid communication with the probe head 10. The fluid communication is configured with a first communication direction 76 for fluid communication with the gas sensor 70 and a second communication direction 78 for fluid communication with the purge gas supply 72. The first and the second communication directions are opposite to each other. The fluid communication from the probe head 10 to the gas sensor 70 and from the between the probe head to the purge gas supply 72, respectively uses a common conduit 60. Only one of the gas sensor 70 or the purge gas supply 72 is in fluid communication with the probe head 10 at a time.

The illustrated leak detectors 1 furthermore comprises an outer purging conduit 62 in fluid communication with a purge gas supply 72 and the probe head 10.

A single or multiple purge gas supplies 72 may be used for communication with the outer purging conduit 62 and the common conduit 60. The embodiments illustrated in FIGS. 3A and 3B both uses a single purge gas supply 72.

The embodiment in FIG. 3A comprises two valves 80. One valve is configured for changing the fluid communication to be between the probe head 10 and the purge gas supply 72 or the gas sensor 70, respectively.

The valve 80 is in communication with the gas sensor 70. The gas sensor 70 may be set with a threshold value. The threshold value may refer to a specific content of signal gas in a sample volume, and may indicate the limit between a positive result and a negative result of the leak detection. The gas sensor may be configured to communicate a change signal 82 to the valve 80 when the threshold value is reached, and the valve 80 may be configured to change the communication direction 76,78 upon receipt of the change signal 82.

The other valve may be configured for changing the fluid communication to be between the probe head 10 and the purge gas supply 72 or the vacuum pump 73, respectively.

Alternatively, the other valve may be configured for controlling the fluid communication with the vacuum pump 73 and the gas sensor 70, such that the vacuum pump may remove residues in the conduit between the valve and the gas sensor. This may be beneficial for further reducing the exposure of the gas sensor to gases before or after completed tests.

The embodiment in FIG. 3B comprises a single valve 80. The valve is configured for changing the fluid communication to be between the probe head 10 and the purge gas supply 72 or the gas sensor 70, respectively. The valve 80 is furthermore in communication with the gas sensor 70 in the same manner as for the embodiment of FIG. 3A.

Alternatively, the system may be configured with two vacuum pumps, one with a high flow for moving detected air as fast as possible from the gas sensor 70. This vacuum pump may be separated from the probe head and the common conduit 60 with a valve. A specific vacuum time can be adjusted for this process.

The other vacuum pump may be connected to the common conduit 60 and the probe head through a control valve to ensure a high vacuum level in the chamber and the common conduit to leak detector unit and secure molecules are passing the gas sensor using counter-flow technology for measuring the incoming air. In one aspect, the vacuum pump may be a pump with dry oil sump or a normal vacuum pump there the oil is sealed. To secure a stable readout from the leak detector it may be beneficial to adjust the time the air is passing the gas sensor.

The leak detector furthermore comprises a timer 74 in communication with the valve 80. The timer may be set with a time interval defining the time span wherein the measurement is performed. The timer may be configured to start the time interval upon receipt of a start signal 84 once the measurement is performed and hence when the communication direction is towards the gas sensor 70. The timer may furthermore be configured to send a change signal 82 to the valve 80 once the end of the time interval is reached.

The valve 80 may then revert the fluid communication direction to be from the purge gas supply 70 to the probe head 10 when receiving a change signal regardless of the sender.

FIG. 4 depicts yet another embodiment of the leak detector 1. The depicted leak detector 1 comprises a position sensor 96 in the probe head 10. The position detector is configured to detect a relative positon of the probe head to a pipe section. The leak detector also comprises a one or more transduces 94.

The transducers are arranged in communication with the position sensor 96, which is illustrated by the dashed arrow line.

The position sensor 96 is configured to communicate a stop signal 86 and the transducer(s) 94 configured receive the stop signal 86. The transducer(s) may furthermore be configured to output an optical and/or acoustic signal upon receipt of the stop signal 86, which may be used to instruct the operator of the leak detector for correct use.

The leak detector furthermore comprises a pneumatic damper 98, which may be configured to regulate the position of the probe head 10 relative to the pipe section as a function of the applied force to the one or more activation points or as a function of the position of the probe head relative to the pipe section.

The probe head 10 is illustrated to comprise at least one probe head port 12 within the clamp 14.

In FIG. 5 two embodiments of the method 100 of leak testing a pipe joint 92 using a leak detector are illustrated. One embodiment of the method is illustrated in the upper part of the dashed line box. This embodiment of the method 100 comprises the acts of:

- arranging 102 the probe head 10 at a distance 90 of a pipe joint 92 to be leak tested;
- supplying 104 a purge gas 32 from the purge gas supply via the common conduit to purge an area surrounding or partly surrounding the pipe joint;
- reverting 106 the communication direction 76,78 in the common conduit to perform suction of one or more sample volumes from the area surrounding or partly surrounding the pipe joint 92;
- performing 108 continuously measurements of content of a signal gas 34 in the one or more sample volume, and another act of
- reverting 106 the communication direction 76,78 in the common conduit to supply purge gas when a threshold value of content of signal gas in a sample volume or a set time-interval is reached.

The other embodiment of the method comprises all the acts illustrated in the dashed line box. This embodiment thus, comprises an additional act of applying 110 an outer purging 36. The outer purging may be applied external to the clamp and may be applied at least during the act of performing 108 continuously measurements of content of a signal gas in the sample volume.

This embodiment may be performed using a leak detector comprising a probe head with a clamp for enclosing the pipe joint and forming a chamber. The leak detector may furthermore comprise an outer purging conduit in fluid communication with a purge gas supply and the probe head for providing an outer purging external to the clamp.

What is claimed is:

1. A leak detector, comprising;

- a probe head comprising one or more probe head ports;
- a gas sensor in fluid communication with said one or more probe head ports having a first communication direction for the gas sensor; and
- a purge gas supply in fluid communication with said one or more probe head ports having a second communication direction for the purge gas supply,
- wherein the first and second communication directions are opposite to each other,
- wherein the gas sensor and the purge gas supply are configured for communication through a common conduit for the fluid communication with the one or more probe head ports, and wherein only one of the gas sensor or the purge gas supply can be in the fluid communication with the one or more probe head ports of the probe head at a time such that the common conduit and one of said one or more probe head ports are used for purging by the purge gas supply or detecting by the gas sensor, wherein the probe head comprises a clamp arranged for shifting between an open position for receiving a pipe section and a closed position for enclosing the pipe section and forming a chamber around the pipe section in the closed position, wherein at least one of said probe head ports opens into an inside of the chamber, wherein the probe head comprises one or more activation points for shifting the clamp from the open position to the closed position by interaction with the pipe section, the activation points being configured for mechanical activation of the clamp by an applied force applied to at least one of the activation points, wherein the clamp is gradually closed as a function of a magnitude of the applied force.

2. The leak detector according to claim 1, further comprising a valve in communication with the gas sensor for changing the communication direction, wherein the gas sensor is set with a threshold value of content of signal gas in a sample volume, and configured to communicate a change signal to the valve, and wherein the valve is configured to change the communication direction upon receipt of the change signal.

3. The leak detector according to claim 2, further comprising a pump and a timer in communication with the valve, wherein the timer is set with a time interval and configured to start upon receipt of a start signal when the valve changes the communication direction towards the gas sensor and further configured to send a change signal to the valve.

4. The leak detector according to claim 1, wherein the clamp is made of an elastic material.

5. The leak detector according to claim 4, wherein the clamp is made of silicone rubber.

6. The leak detector according to claim 4, wherein the clamp comprises an inner part, an outer part having a lower jaw and an upper jaw, and two connection points connecting the upper jaw with the lower jaw, the clamp comprises a transversal opening between the connection points arranged to receive the pipe section, wherein at least one of the connection points is configured as at least one of the one or more activation points, and wherein the mechanical activation of the clamp is by means of deformation of the clamp.

7. The leak detector according to claim 3, further comprising an outer purging conduit in fluid communication with a purging gas supply and the probe head, wherein one or more probe head ports opens to an exterior of the clamp for providing an outer purging of the clamp.

8. The leak detector according to claim 3, further comprising a position sensor for detecting the position of the pipe section relative to the clamp and one or more transducers in communication with the position sensor, wherein the position sensor is configured to communicate a stop signal and the one or more transducers are configured to output at least one of an optical and acoustic signal upon receipt of the stop signal.

9. The leak detector according to claim 3, further comprising a dampening unit adapted to be set with a threshold force value and configured to regulate the position of the probe head relative to the pipe section as a function of the applied force to the one or more activation points.

10. A method of leak testing a pipe joint using a leak detector according to claim 1, the method comprising:

clamping the probe head onto the pipe joint to be leak tested;

supplying a purge gas from the purge gas supply via the common conduit to purge an area surrounding or partly surrounding the pipe joint;

reversing the communication direction in the common conduit to perform suction of one or more sample volumes by a pump from the area surrounding or partly surrounding the pipe joint;

performing continuous measurements of content of a signal gas in the one or more sample volume;

reversing the communication direction in the common conduit to supply purge gas when a threshold value of content of signal gas in a sample volume or a set time-interval is reached; and determining that the pipe joint is leaking if the content of the signal gas is above the threshold value.

11. The method according to claim 10, wherein the leak detector further comprises an outer purging conduit in fluid communication with the purge gas supply and the probe head for providing an outer purging external to the clamp, said method comprising a further act of applying an outer purging external to the clamp at least during the act of performing continuous measurements of content of a signal gas in the sample volume.

12. The method according to claim 10, wherein the leak testing is conducted for pipe systems in refrigerators, freezers, AC units, or AC in cars for detecting the signal gas or the refrigerant applied to the pipe system during the leak test.

* * * * *